United States Patent [19]

Testin et al.

[11] Patent Number: 4,689,685
[45] Date of Patent: Aug. 25, 1987

[54] TELEVISION TUNING SYSTEM WITH AFT PROVISIONS

[75] Inventors: William J. Testin; Juri Tults, both of Marion County, Ind.

[73] Assignee: RCA Corporation, Princeton, N.J.

[21] Appl. No.: 824,602

[22] Filed: Jan. 31, 1986

[51] Int. Cl.⁴ .............................................. H04N 5/50
[52] U.S. Cl. .................................. 358/195.1; 455/192
[58] Field of Search ............... 358/191.1, 193.1, 195.1; 455/182, 183, 192, 164, 174, 195

[56] References Cited

U.S. PATENT DOCUMENTS

| | | | |
|---|---|---|---|
| 4,302,778 | 11/1981 | Tanaka | 358/195.1 |
| 4,387,400 | 6/1983 | Borg | 358/191.1 |
| 4,405,947 | 9/1983 | Tults et al. | 358/193.1 |
| 4,429,415 | 1/1984 | Chin | 358/195.1 |
| 4,439,787 | 3/1984 | Mogi | 358/195.1 |

Primary Examiner—Tommy P. Chin
Attorney, Agent, or Firm—Eugene M. Whitacre; Paul J. Rasmussen; Peter M. Emanuel

[57] ABSTRACT

In a tuning control system for a television receiver, an analog AFT signal is sampled during blanking intervals when the amplitude of the video carrier is relative constant and therefore cannot affect the amplitude of the AFT signal significantly. This reduces the AFT filtering requirements.

10 Claims, 3 Drawing Figures

TELEVISION TUNING SYSTEM WITH AFT PROVISIONS

BACKGROUND OF THE INVENTION

1. Field of the Invention

The present invention concerns a tuning system for a television receiver with automatic fine tuning (AFT) provisions.

2. DESCRIPTION OF THE RELATED ART

Most television receivers include circuitry for generating an analog AFT signal the polarity and the magnitude of which represent the polarity and magnitude of deviation of the frequency of the amplitude molulated picture carrier of the IF signal from its nominal frequency value. The AFT signal is applied to the local oscillator of the tuner of the television receiver to reduce the frequency deviation of the IF picture carrier.

Originally, the AFT signal was used to correct for the drift of the local oscillator signal due to temperature and aging. Closed loop phase and frequency locked tuning systems (often known as frequency synthesis tuning systems), which "lock" the frequency of the local oscillator signal to a reference frequency, obviate the need for an AFT signal for the above-stated purpose. However, an AFT signal is typically employed in frequency synthesis tuning systems to correct for frequency deviations of the IF picture carrier due to corresponding frequency offsets between the picture carriers of the RF signals provided by some television signal sources such as cable systems, video tape and disk players, home computers and cameras, and nominal frequency values as specified by broadcast standards.

In one type of frequency synthesis tuning system with AFT provisions, such as is disclosed in U.S. Pat. No. 4,405,947 issued to J. Tults and M. P. French on Sept. 30, 1983, after the frequency of the local oscillator signal is locked to the nominal local oscillator frequency for a selected channel by a phase locked loop, the analog AFT signal is coupled to the local oscillator through the lowpass filter of the phase locked loop to control the local oscillator directly to correct for RF signal frequency offsets. Because the lowpass filter has to filter the AFT signal as well as the output signal of the phase comparator of the phase locked loop, the filter may be complex in order to ensure proper AFT response time and sensitivity throughout the relatively wide television tuning range.

In another type of frequency synthesis tuning system with AFT provisions, such as described in U.S. Pat. No. 4,302,778 issued to A. Tanaka on Nov. 24, 1981, the AFT signal is not coupled directly to the local oscillator but rather is used to change the frequency of the local oscillator in small steps by controlling the division factor of a programmable division factor of the phase locked loop comprising the frequency synthesizer. In such a system, since the AFT signal is not filtered by the lowpass filter of the phase locked loop, the design constraints of the filter can be relaxed.

SUMMARY OF THE INVENTION

Even though the AFT signal generation circuitry includes components, such as filter and amplitude limiting elements, which tend to reduce fluctuations of the level of the AFT due to the amplitude modulation of the video carrier corresponding to image information, it is herein recognized that even small fluctuations of the level of the AFT signal can produce undesirable effects under certain circumstances.

In systems in which the AFT signal is used to control the frequency of the local oscillator signal indirectly by controlling the value of a programmable factor, such as is disclosed in the Tanaka patent, typically the level of the AFT signal is compared to fixed upper and lower threshold levels defining the boundaries of a frequency range or "window" corresponding to correct tuning. Depending on which threshold level is traversed by the AFT signal, the programmable division factor is either increased or decreased. In this type of threshold sensitive system, when the AFT signal level is near one of the two threshold levels, fluctuations of the level of the AFT signal may cause the threshold level to be traversed. This causes the programmable factor to be changed incorrectly causing a corresponding incorrect step-wise change of the frequency of the local oscillator signal. In addition, changes in the sense of fluctuations of the level of the AFT signal may cause the threshold level to be repeatedly traversed in opposite senses causing corresponding step-wise changes of the frequency of the local oscillator signal in opposite senses. When the AFT signal is used to directly control the local oscillator, such as is disclosed in the Tults et al. patent, since the AFT control operation is continuous and not threshold sensitive, step-wise changes of the frequency of the local oscillator signal due to fluctuations of the level of the AFT signal tend not to occur.

Fluctuations of the frequency of the local oscillator signal cause corresponding fluctuations of the frequencies of the picture and sound carriers of the IF signal that may result in visible and audible disturbances. For example, for improved reproduction of television stereo information, it is desirable to increase the bandwidth of the sound channel compared with that for monaural sound information. Because of the increased bandwidth desirable for stereo sound processing, frequency fluctuations of the local oscillator signal can cause corresponding disturbances (sometimes referred to as "buzz") in the audio response. Thus, while the conventional filtering of the AFT signal has been found adequate for monaural sound reproduction it may not be adequate for stereo sound reproduction, especially in threshold sensitive AFT systems such as described above. However, mitigating against increasing the filtering of the AFT signal, in addition to the addition of filter components, is the desire to maintain proper AFT response time and sensitivity throughout the relatively wide television tuning range.

Thus, there is a desire to guard against variations of the amplitude of the AFT signal due to variations of the amplitude of the amplitude modulated video carrier from which it is derived without increasing AFT filtering, especially if it can be done simply and, therefore, inexpensively.

In accordance with an aspect of the present invention, in a television receiver, a representation of an analog AFT is selectively sampled and stored during blanking intervals when the amplitude of the amplitude modulated video carrier is relatively constant. The stored AFT representation is used by a tuning control system to generate a tuning control signal for the tuner of the receiver.

BRIEF DESCRIPTION OF THE DRAWINGS

The above and other features of the present invention will be described with respect to the accompanying Drawings in which.

DESCRIPTION OF THE PREFERRED EMBODIMENT

Figure 1:
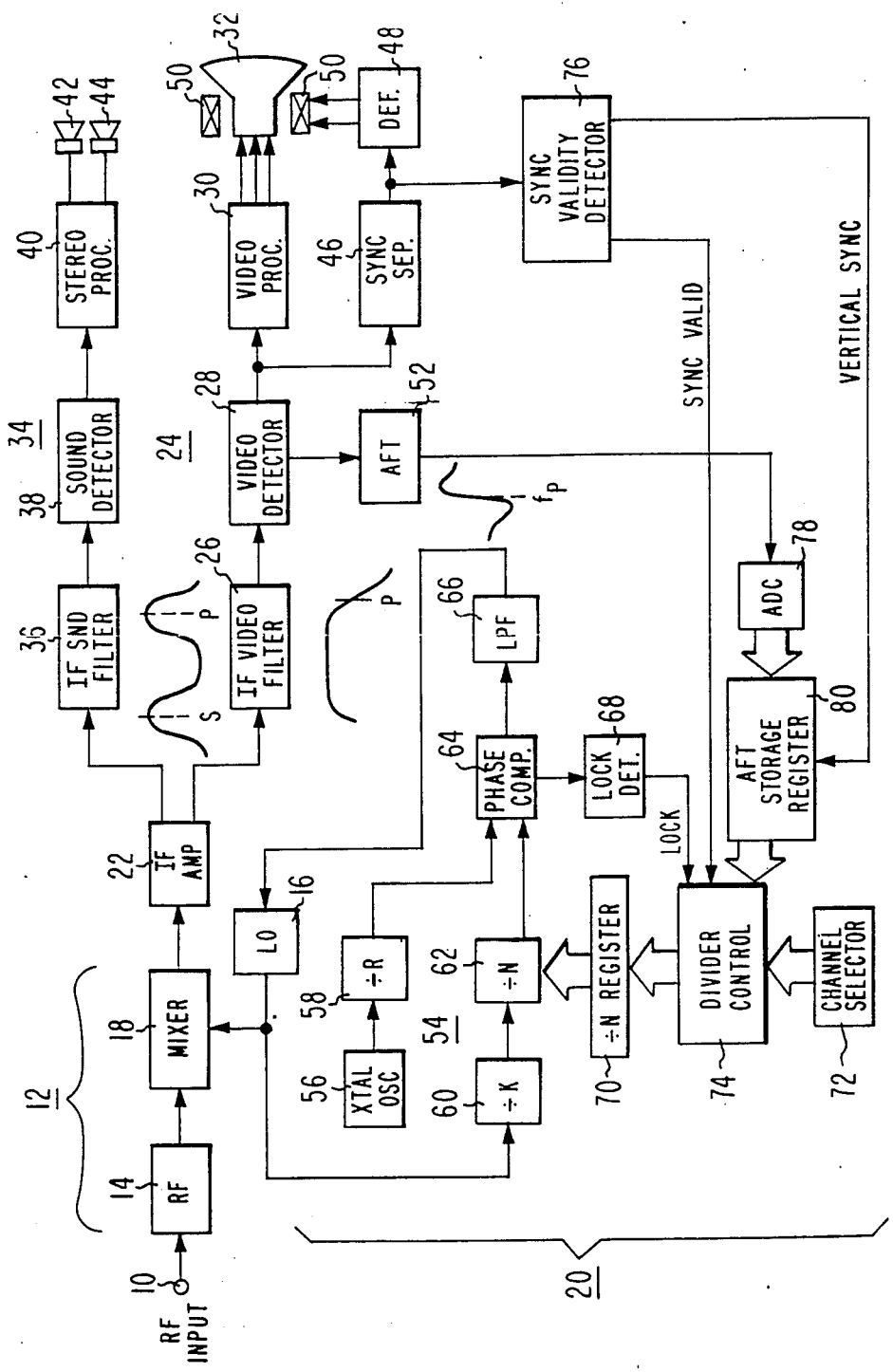
FIG. 1 shows, in block form, a preferred embodiment of the present invention.

In the television receiver shown in FIG. 1, RF television signals are coupled to an RF input 10 from a signal source which is not shown. For example, the signal source may comprise a broadcast receiving antenna, a cable distribution network, a direct broadcast satellite (DBS) system, a video tape or disk player, a home computer or a video game. A tuner 12, comprising an RF amplifying stage 14, local oscillator 16 and mixer 18 arranged in conventional fashion, converts the RF signal of a selected receiving channel to a corresponding IF signal. Tuner 12 is controlled in response to a tuning control signal generated by a tuning control system 20. The IF signal, like the RF signal from which it is derived, has modulated video and sound carriers. The IF signal is amplified by an IF amplifier 22 and thereafter coupled to video and sound channels 24 and 34, respectively.

Video channel 24 includes an IF filter 26, a video detector 28, a video signal processing unit 30 and a picture tube 32 arranged in conventional fashion. By way of example, video detector 28 may comprise a synchronous detector. Sound channel 34 includes an IF filter 36, a sound detector 38, a stereo sound signal processing unit 40 and left and right speakers 42 and 44 also arranged in conventional fashion. By way of example, sound detector 38 may comprise a synchronous detector operated as an intercarrier sound mixer which mixes the video carrier with the sound carrier as is known.

The video signal produced at the output of video detector 28 includes active picture components during horizontal trace intervals of a vertical trace period and horizontal and vertical synchronization pulses corresponding to respective horizontal and vertical retrace intervals. This composite video signal is coupled to a synchonization signal generator 46 which removes the active picture components to form a composite synchronization ("sync") signal containing the horizontal and vertical synchronization pulses. The composite sync signal is processed by a deflection unit 48 in conventional fashion to derive horizontal and vertical trace and retrace deflection signals for deflection coils 50 associated with picture tube 32. The image produced by picture tube 32 is scanned during the trace intervals and blanked during the retrace intervals.

An automatic fine tuning (AFT) signal detector 52 is responsive to the frequency of the IF video carrier for developing an analog AFT signal, the level of which by its polarity and magnitude represent the polarity and and magnitude of the deviation between the frequency of the IF video carrier and a nominal frequency value. The AFT signal is applied to tuning control unit 20 in the manner to be described below to assist in the generation of the tuning control signal for tuner 12.

IF filter 36 of video channel 24 is separate from IF filter 26 of sound channel 34 to enhance the stereo peformance of the receiver. More specifically, while IF filter 26 for video channel 24 has the video or picture carrier (P) located on a sloped portion to compensate for the vestigal sideband transmission of video information, IF filter 36 for sound channel 34 has a substantially symmetrical peaked response centered around the picture carrier, as well as a substantially symmetrical peaked response centered around the sound (S) carrier. The symmetry characteristic of IF sound filter 26 inhibits the generation of audio "buzz" that might be generated in a television receiver in which the video carrier for intercarrier sound mixing is passed through a filter having a sloped response for video components due to amplitude and phase modulation introduced because of the slope of the IF video filter. In a stereo television receiver the generation of audio buzz becomes a much more significant problem because of the much wide bandwidth required for stereo reproduction than for monaural reproduction. The benefit of the symmetrical response of IF sound filter 36 in inhibiting audio buzz may be significantly reduced if the frequencies of the IF picture and sound carriers are allowed to fluctuate with respect to respective nominal values since thay may move along the sloped portions of the respective peaked response characteristics. The present invention is directed to inhibiting fluctuations of the frequencies of the IF picture and sound carriers in response to variations of the automatic fine tuning operation of tuning control system 20 caused by corresponding variations in the amplitude of the modulated video carrier.

Tuning control system 20 is of the frequency synthesis type including a phase locked loop (PLL) 54. Phase locked loop 54 includes a crystal oscillator 56, a frequency divider ($\div$R) 58, a frequency divider ($\div$K) 60, a frequency divider ($\div$N) 62, a phase comparator 64 and a lowpass filter (LPF) 66 arranged in conventional fashion with local oscillator 16. Phase locked loop 54 locks the frequency of the local oscillator signal to the frequency of the crystal oscillator signal produced by crystal oscillator 56 by a factor NK/R. A lock detector 68, coupled to phase comparator 64, generates a "lock" signal, indicating that the frequency of the local oscillator signal is locked to that of the crystal oscillator signal, when the phase and frequency difference between the two input signals falls below a predetermined value. The frequency of the crystal oscillator signal and the division factors R and K are selected so that the frequency of the local oscillator signal is equal to N in mHz.

The division factor, N, of frequency divider 62 is programmable so that channels can be selected by changing the value of N. A digital representation of division factor N is stored in a register 70. When a channel is selected by a user, e.g., by entering the tens and units digit of the channel via a keyboard of a channel selection unit 72, a divider control unit 74 generates the appropriate digital representation of the division factor N as will be described below.

For broadcast RF television RF signals having video and sound with nominal or standard frequencies, designated by broadcast standards, the division factors N can be set to predetermined nominal values in accordance with the channel selected. When the RF signal source is other than a broadcast receiving antenna, such a cable distribution network, DBS system, video tape or disk player, home computer or video game, the frequencies of the picture and sound carriers of the received RF signals may be offset from the respective nominal or standard broadcast frequencies. Usually both the video and sound carriers will be offset in frequency by the same amount. If the division factor N is set for broadcast frequencies, the frequencies of the carriers of the IF signal will be offset by amounts corresponding to the offsets of the carriers of the received RF signal. Accordingly, to avoid frequency offsets due to nonstandard frequency RF signals, frequency division factor N is controlled in a search algorithm in response to the condition of the composite synchronization signal and the AFT signal as follows.

For tuning a nonstandard frequency RF signal, after a new channel is selected, division factor N is initially set to a predetermined value corresponding to a local oscillator frequency within the tuning range for the selected channel (e.g., 6 mHz for the NTSC standard). When divider control unit 74 receives a lock signal from lock detector 68, the condition of the composite sync signal is examined. For this purpose, a sync validity detector 76, which is responsive to the composite sync signal, is provided. If the condition of the composite sync signal is proper, sync validity detector 76 generates a "sync valid" signal. If a "sync valid" signal not generated for the initial value of N, the vaue of N is changed in a predetermined sense (e.g., increasing) in steps corresponding to frequency steps (e.g., 0.5 mHz) of the local oscillator signal unit the "sync valid" signal is generated. Thereafter the AFT signal is utilized to fine tune the frequency of the local oscillator signal since the search in response to the condition of the composite sync signal is made in relatively large (e.g., 0.5 mHz) frequency steps.

The portions of the television receiver of FIG. 1 so far described can be built in the same manner as corresponding parts of television receivers of the CTC-131 chassis type manufactured and sold by RCA Corporation, Consumer Electronics Division, Indianapolis, Ind. and disclosed in detail in "RCA Color Television Basic Service Data for the CTC-131 Series", file 1984, CTC-131, second edition.

The tuning control algorithm described so far corresponds to that employed in RCA CTC-131 receivers and is described in greater detail in the aforementioned Tults et al. patent. According to that tuning algorithm, the AFT signal is applied in analog form through the lowpass filter of the phase locked loop to the local oscillator once the sync valid signal is generated. However, in the tuning control system 20 shown in FIG. 1, the AFT signal is not coupled through lowpass filer 66 to control local oscillator 16 directly but rather controls it indirectly by controlling division factor N, as will be explained below. Since lowpass filter 66 does not have to filter the AFT signal, its design can be simplified by removing filter elements required for attenuating video signal components from the AFT signal. In addition to the cost saving, this allows PLL 54 to lock faster.

However, as noted earlier the reduction of AFT filtering can have an adverse effect. While AFT unit 52 itself has filtering, i.e., a tuned circuit, and amplitude limiting components, such provisions are not completely effective in preventing the level of the AFT signal from fluctuating in response to amplitude variations of the modulated video carrier from which the AFT signal is derived. The video amplitude caused fluctuation of the AFT signal in turn can cause corresponding frequency fluctuations of the local oscillator signal and, as a result, frequency fluctuations of the IF picture and sound carriers. This may not be particularly noticeable in a monaural television receiver. However, in stereo television receiver with a relatively wide bandwidth sound channel compared to that of a monaural receiver, it can produce disturbing audio buzz. Specifically, as noted earlier, it can cause the video and sound carriers to be moved along sloped portions of the respective peaked responses of IF sound filter 26. This causes amplitude and phase modulation of the video carrier which can cause audio buzz.

To overcome this problem, in the present tuning control system, the level of the analog AFT signal generated during the vertical sync pulse interval, when the amplitude of the modulated video carrier is relatively constant, is stored. In response to the AFT level stored during the vertical sync pulse interval, divider control unit 74 changes division factor N to adjust the local oscillator frequency in steps to reduce the frequency deviation of the carriers of the IF signal.

Specifically, in tuning control system 20, the analog AFT signal is converted to a digital representation by an analog-to-digital converter (ADC) 78. During the vertical sync pulse interval, in response to a signal indicating the occurrence of the vertical sync pulse interval generated as will be described below, a latch or storage register 80 is enabled to store the then occurring digital representation of the AFT signal level. The contents of storage register 80 are examined by divider control unit 74 during the tuning control algorithm to control division factor N and thereby the frequency of the local oscillator signal.

Figure 2:
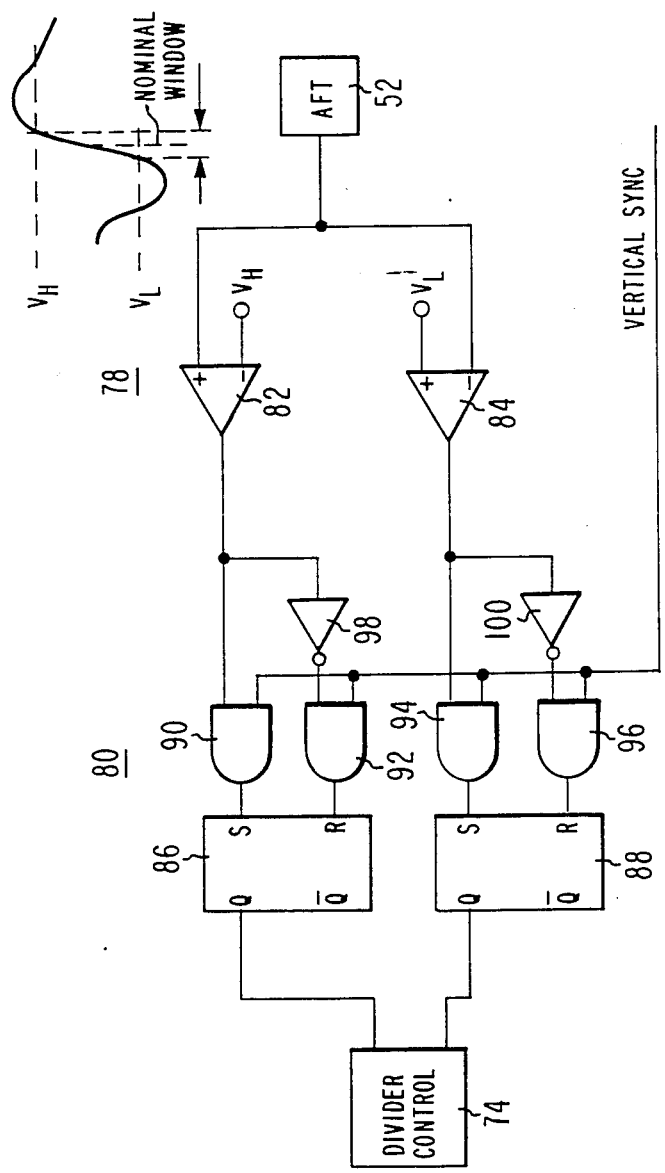
FIGS. 2 and 3 show, in schematic and block forms, respectively, implementations of respective portions of the embodiment shown in FIG. 1.

FIG. 2 shows an implementation of ADC 78 and storage register 80. ADC 78 includes an upper threshold comparator 82 for determining when the level of the S-shaped analog AFT signal is above an upper threshold level ($V_H$) and a lower threshold comparator 84 for determining when the level of the analog AFT signal is below a lower threshold level ($V_L$). Storage register 80 comprises two set-reset (S-R) flip flops 86 and 88, four "and" function gates 90, 92, 94 and 96 and two "inverters" 98 and 100. Flip-flops 86 and 88 are enabled to respond (i.e., to be set or reset) in response to the output signals of comparators 82 and 84, respectively, when the signal indicative of the occurrence of the vertical sync pulse interval is applied to "and" function gates 90–96. With the configuration shown, storage register 80 stores a two-bit digital word representing the frequency of the IF picture carrier as follows:

| FF 86 | FF 88 | $f_{IF}$ |
|---|---|---|
| 1 | 0 | high |
| 0 | 1 | low |
| 0 | 0 | correct (within window) or beyond humps |
| 1 | 1 | not possible (frequency both high and low) |

The two-bit digital representation of the AFT signal stored during the vertical sync pulse interval is utilized by divider control unit 74 in the following way to tune nonstandard frequency RF signals. As described above, after a new channel is selected, divider control unit 74 searches the local oscillator tuning range for the selected channel from an initial frequency in relatively large steps (e.g., 0.5 mHz) in a given frequency sense (e.g., increasing) until the "sync valid" signal is generated. When the "sync valid" signal is generated, the frequency of the IF picture carrier is either within the positive "hump" (i.e., above the upper threshold level) of the AFT signal or within the negative "hump" (i.e., below the lower threshold level). Accordingly, after the "sync valid" signal is generated, the digital word stored in storage register 80 will indicate that the frequency of the IF picture carrier is either high or low. In response, divider control unit 74 either decreases or increases division factor N to correspondingly change the frequency of the local oscillator signal in small steps (e.g., 31.25 kHz) until the digital representation of the AFT signal indicates that the AFT signal is in the frequency window (e.g., about 250 kHz wide) between the two humps. This condition corresponds to a correct tuning condition.

The frequency division control units used in RCA CTC-131 type receivers and described in the aforementioned Tults et al. patent suitable for use as division control unit 74 comprise dedicated logic circuits. Alternatively, division control unit 74 may comprise a microprocessor as is disclosed in the aforementioned Tanaka patent.

Figure 3:
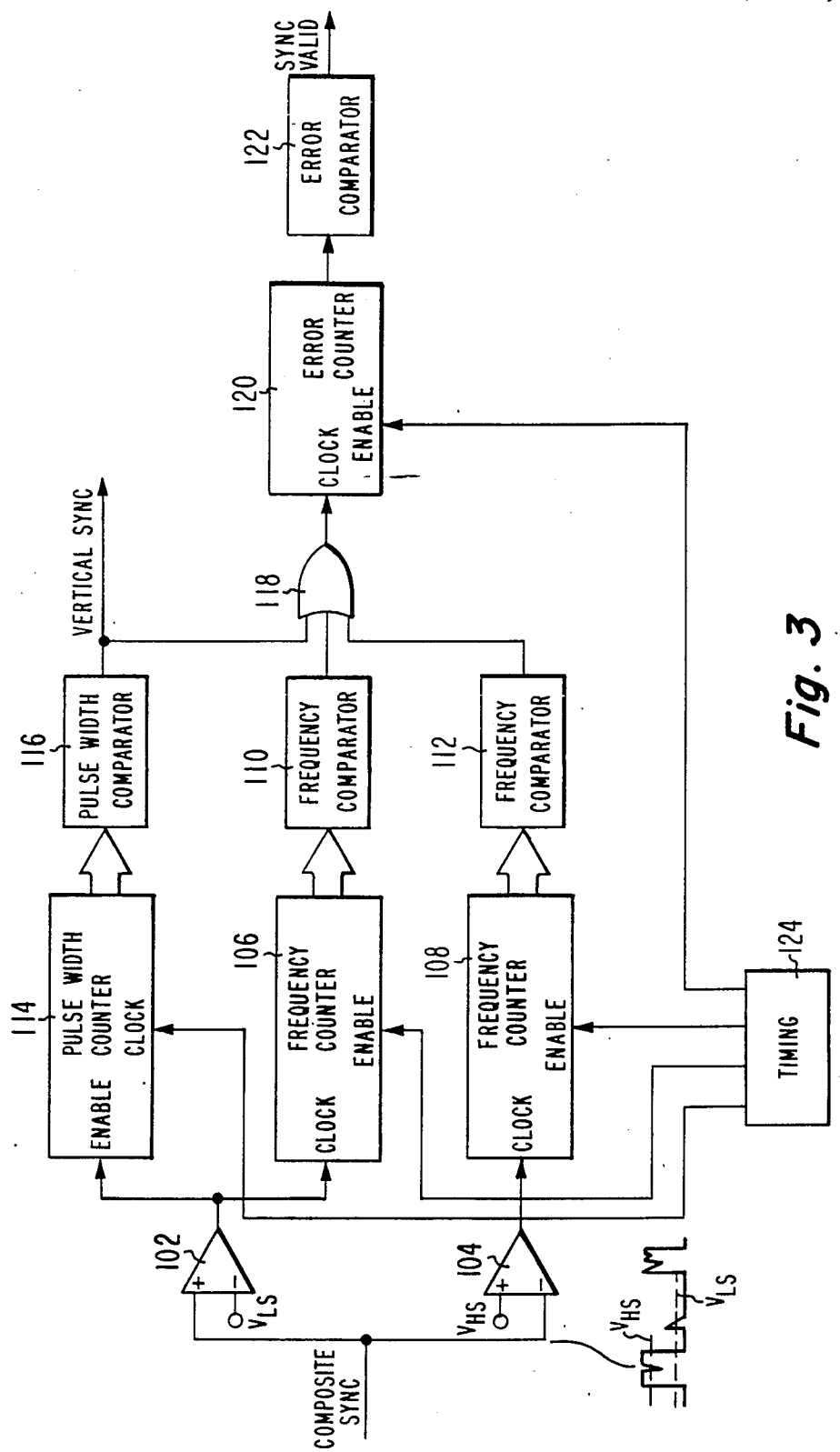

In the receiver shown in FIG. 1 sync validity detector 76 conveniently serves the dual purpose of generating the "sync valid" signal and signal indicating the occurrence of the vertical sync pulse interval. FIG. 3 shows an implementation of sync validity detector 76. Basically, sync validity detector 76 examines the frequency and pulse width of the horizontal sync pulses of the composite sync signal generated by sync separator 46 to determine if the composite sync signal is proper.

Specifically, the composite sync signal is coupled to a comparator 102 for generating positive-going pulses whenever the composite sync signal exceeds a lower threshold ($V_{LS}$) near the minimum amplitude level of the composite sync signal and to a comparator 104 for generating positive-going pulses whenever the composite sync signal falls below an upper threshold level ($V_{HS}$) near the maximum amplitude level of the composite sync signal. If noise transients are absent from the composite sync signal, comparators 102 and 104 will produce only pulses corresponding to the actual sync pulses of the composite sync signal. However, if the composite sync signal is improper or excessively contaminated with noise transients, extra pulses will be produced by comparators 102 and 104. The number of pulses produced by comparators 102 and 104 are counted by respective counters 106 and 108 during a convenient measuring interval to measure the frequency of the synchronization pulses. Whenever the counts accumulated by counter 106 and counter 108 during the measurement interval do not fall within a predetermined range, a frequency error signal is generated by a respective one of count comparators 110 and 112.

To measure the pulse width of the synchronization pulses, the number of pulses of a clock signal are counted by a counter 114 during the duration of the positive-going pulses generated by comparator 102. Whenever the count accumulated by counter 114 does not fall within a predetermined range, a pulse width error signal is generated by a count comparator 116.

The frequency and pulse width error signals are coupled through an "or" function gate 118 to a counter 120 which counts the number of errors accumulated over a given interval, such as that corresponding to a field of the television signal. If the error count is less than a predetermined number, the "sync valid signal" is generated by a count comparator 122. It will be appreciated that the frequency and duration of the sync pulses of the composite sync signal are not uniform during a field of the television signal due to the presence of pre- and post-equalizing pulses and vertical sync pulses which occur during the vertical blanking interval. These nonuniformities are accounted for in setting the error threshold of error comparator 122.

The various timing signals described above are generated by a timing signal generator 124. Circuit details of the various portions of sync validity detector 76 shown in block diagram form in FIG. 3 are disclosed in the aforementioned Tults et al. patent.

It is recognized here that once the composite sync signal is determined to be correct, the error signal generated by pulse width comparator 116 indicates the occurence of the sync pulses occuring during the vertical blanking interval since the sync pulses have a much longer duration (e.g., approximately 28 microseconds) compared with the horizontal sync pulses (3. g., 4 microseconds). Accordingly, the signal indicative of the vertical sync pulse interval is taken at the output of pulse width comparator 116.

With the arrangement shown in FIG. 3, the AFT signal level will be stored in AFT storage register 80 during each sync pulse of the vertical sync pulse interval since each sync pulse has a duration which exceeds the duration threshold of pulse width comparator 116. However, only the AFT signal level that was stored for the last sync pulse in the vertical sync interval is used to control division factor N. If desired, a counter may be used to generate the signal indicating occurrence of the vertical sync pulse interval at only one particular pulse of the plurality of sync pulses.

In the receiver shown in FIG. 1, sync validity detector 76, which is used to generate the "valid sync" signal, is also advantageously used to generate the signal indicating the occurrence of the vertical sync pulse interval. However, in receivers not employing a sync validity detector of the type described with reference to FIG. 3, the signal representing the occurrence of the vertical sync pulse interval may be generated by other circuits. For example, an integrator may be employed to generate a signal indicative of the occurrence of the vertical sync pulse interval from the composite sync signal. If desired, a differentiator followed by a counter may be added to count transitions of the composite sync signal during the output signal of the integrator indicating the occurrence of the sync pulse interval to select a particular sync pulse during which the AFT level is stored.

While in the receiver shown in FIG. 1, the AFT level is stored during the vertical sync pulse interval of vertical blanking periods, it may also be stored during the horizontal blanking periods.

It is intended that the following claims encompass modifications described above to the arrangements shown in FIGS. 1, 2 and 3 as well as others.

What is claimed is:

1. In a television receiver including a tuner with a local oscillator responsive to a tuning control signal and a mixer for converting received RF television signals to IF televison signals; said RF and IF signals including corresponding modulated video and sound carriers; a demodulation section for demodulating said modulated video and sound carriers to produce baseband video and sound signals, said baseband video signal including active picture components occurring during active trace intervals and horizontal and vertical synchronization components occurring during respective blanking intervals; and video and sound processing sections; apparatus comprising:

AFT means responsive to said IF signal for producing an analog AFT signal the level of which by its polarity and magnitude represents the polarity and magnitude of the deviation of the frequency of one of said carriers of said IF signal from a nominal frequency value;

detector means responsive to at least one of said synchronization components of said video signal for determining the occurrence of the corresponding blanking intervals exclusive of the corresponding trace intervals;

storage means coupled to said AFT means and to said detector means for storing a representation of said AFT signal occuring exclusively during ones of said blanking intervals; and tuner control means responsive to said representation of said AFT signal stored by said storage means for generating said tuning control signal for said tuner.

2. The apparatus recited in claim 1 wherein:
said storage means includes analog-to-digital converter means for converting said analog signal to a representative digital word.

3. The apparatus recited in claim 1 wherein:
said tuner control means includes frequency synthesis means for locking the frequency of a local oscillator signal produced by said local oscillator to a reference frequency value, said frequency synthesis means including a programmable register for storing a programmable factor which determines the ratio between the frequency of the local oscillator signal and said reference values; and register control means for controlling said programmable factor in response to said representation of said AFT signal stored by said storage means during said ones of said blanking intervals.

4. The apparatus recited in claim 1 wherein:
said ones of said blanking intervals correspond to said vertical blanking intervals.

5. In a television receiver including a tuner with a local oscillator responsive to a tuning control signal and a mixer for converting received RF television signals to IF television signals; said RF and IF signals including corresponding modulated video and sound carriers; a demodulation section for demodulating said modulated video and sound carriers to produce baseband video and sound signals, said baseband video signal including active picture components occurring during active trace intervals and horizontal and vertical synchronization components occurring respective blanking intervals, said sound signal including stereo components; and video and sound processing section, said sound processing section including stereo signal processing apparatus for processing said stereo components, apparatus comprising:

AFT means responsive to said IF signal for producing an analog AFT signal the level of which by its polarity and magnitude represents the polarity and magnitude of the deviation of the frequency of one of said carriers of said IF signal from a nominal frequency value;

detector means responsive to at least one of said synchronization components of said video signal for determining the occurrence of the corresponding blanking intervals exclusive of the corresponding trace intervals;

storage means coupled to said AFT means and to said detector means for storing a representation of said AFT signal occurring exclusively during ones of said blanking intervals; and tuner control means responsive to said representation of said AFT signal stored by said storage means during for generating said tuning control signal for said tuner.

6. The apparatus recited in claim 5 wherein:
said storage means includes analog-to-digital converter means for converting said analog signal to a representative digital word.

7. The apparatus recited in claim 5 wherein:
said tuner control means includes frequency synthesis means for locking the frequency of a local oscillator signal produced by said local oscillator to a reference frequency value, said frequency synthesis means including a programmable register for storing a programmable factor which determines the ratio between the frequency of the local oscillator signal and said reference values; and register control means for controlling said programmable factor in response to said representation of said AFT signal stored by said storage means during said ones of said blanking intervals.

8. The apparatus recited in claim 5 wherein:
said ones of said blanking intervals correspond to said vertical blanking intervals.

9. In a television receiver including a tuner with a local oscillator and a mixer for converting received RF television signals to IF television signals; said RF and IF signals including corresponding modulated video and sound carriers; a demodulation section for demodulating said modulated video and sound carriers to produce baseband video and sound signals, said baseband video signal including active picture components occurring during active trace intervals and horizontal and vertical synchronization pulses occurring during respective blanking intervals; and video and sound processing sections; apparatus comprising:

AFT means responsive to said IF signal for producing an analog AFT signal the level of which by its polarity and magnitude represents the polarity and magnitude of the deviation of the frequency of one of said carriers of said IF signal from a nominal frequency value;

detector means responsive to at least one of said synchronization pulses of said video signal for determining the occurrence of the corresponding blanking intervals exclusive of the corresponding trace intervals;

storage means coupled to said AFT means and to said detector means for storing a representation of said AFT signal occurring exclusively during ones of said blanking intervals; and frequency synthesis means for locking the frequency of a local oscillator signal produced by said local oscillator to a reference frequency value, said frequency synthesis means including programmable register means for storing a programmable factor which determines the ratio between the frequency of the local oscillator signal and said reference values; and register control means for controlling said programmable factor in response to said representation of said AFT signal stored by said storage means.

10. The apparatus recited in claim 9 wherein:

said ones of said blanking intervals correspond to said vertical blanking intervals;

said detector means includes synchronization signal separator means for deriving a composite synchronization signal including said horizontal and vertical synchronization pulses from said video signal; pulse width detection means for generating a first error signal when the pulse width of said horizontal synchronization pulses of said composite synchronization signal exceeds a predetermined pulses width, frequency detection means for generating a second error signal when the frequency of said horizontal synchronization pulses of said composite synchronization signal is outside a predetermined frequency range; counter means for counting the number of occurrences of said first and second error signals; and count comparison means for generating a validity signal indicative of the validity of said composite synchronization signal; and said storage means is coupled to said pulse width detection means for storing said representation of said AFT signal in response to said first error signal; and said register control means is coupled to said detector means for controlling said programmable factor until said validity signal is generated and thereafter controlling said programmable factor in response to said representation of said AFT signal stored by said storage means in response to said first error signal.

* * * * *